Patented May 18, 1943

2,319,575

UNITED STATES PATENT OFFICE 2,319,575

RESINOUS COMPOSITION

Maynard C. Agens, Schenectady, N. Y., assignor to General Electric Company, a corporation of New York No Drawing. Application March 27, 1940, Serial No. 326,272

5 Claims. (Cl. 260—77)

This invention relates to the production of new materials having valuable and characteristic properties that make them especially suitable for use in industry, for example in laminating, casting, coating, impregnating and adhesive applications, and for other purposes. The invention is concerned more particularly with compositions of matter comprising essentially the esterification product (resinous reaction product) of at least one polyhydric alcohol, e. g., glycerol, at least one alcohol-ether containing a single alcoholic hydroxyl group, e. g., ethylene glycol monoethyl ether, tetrahydrofurfuryl alcohol

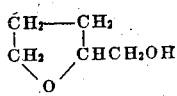

and at least one alpha unsaturated alpha beta polycarboxylic acid (or an anhydride thereof, if available), e. g., maleic acid or anhydride. The scope of the invention includes both the polymerizable and the polymerized esters produced by chemical interaction of the above reactants; also, compositions comprising the product of polymerization of a mixture containing these new polymerizable esters and at least one other organic compound copolymerizable therewith and containing the structure

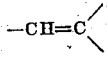

It has been suggested heretofore, for instance in Kienle Patent 1,921,756 and Arsem Patent 1,938,791, to produce esterification products of monohydric alcohol, polyhydric alcohol and polycarboxylic acid. It also has been known that water-soluble, oxygen-convertible esters could be produced by reaction of an unsaturated polycarboxylic acid with a polyhydric alcohol-ether containing at least three ether linkages. However, to the best of my knowledge and belief it was not known or appreciated prior to my invention that polymerizable resinous compositions capable of curing rapidly in film form to a hard, tough insoluble, infusible state could be prepared by chemically interacting a monohydric alcohol-ether, a polyhydric alcohol and an alpha unsaturated alpha beta polycarboxylic acid.

My invention provides a new class of synthetic materials exhibiting many of the properties of the conventional oil-modified alkyd resins. They are superior to such resins in numerous respects, for example in drying or curing rates, film hardness, etc. These new products even in the absence of a polymerization catalyst such as benzoyl peroxide are oxygen-convertible to an insoluble, infusible state, their air-drying and baking properties being such that they may be termed "synthetic drying oils." This is in marked contrast with the properties of the neutral ester bodies described in Arsem Patent 1,938,791. These bodies are viscous non-drying liquids or permanently fusible solids and are incapable of polymerization.

The polymerizable resinous materials of this invention vary from viscous liquids of light yellow color to soft semi-solids of dark amber color. In general, they are soluble in the ordinary organic solvents, for example acetone, diacetone, ethyl acetate, mixtures of benzene and alcohol, toluene and alcohol, etc. The polymerized resins are tough, abrasion- and moisture-resistant materials. Cured films of the material are flexible and have a high gloss.

By chemically tying in a monohydric alcohol-ether into an unsaturated alkyd resin molecule, a fluid or semi-solid product especially adapted for the production of coating and impregnating compositions is obtained. The excellent drying characteristics of the material are believed to be due to the fact that the ether linkage of the monohydric alcohol-ether forms peroxides. The initially formed peroxidized ester then probably acts as a polymerization catalyst for the remainder of the resinous mass. That some such reaction and self-catalysis take place during polymerization of these new polymerizable esters is evidenced by the fact that tetrahydrofurfuryl maleate can be peroxidized, for instance by heating it in air or oxygen. The peroxidized maleate then can be used as a catalyst for the polymerization of other polymerizable organic compounds containing a

grouping, for example diallyl itaconate, diethylene glycol maleate, etc. Compositions comprising a polymerizable organic compound and a peroxidized ester as a polymerization catalyst therefor are more fully disclosed and broadly claimed in my copending application, Serial No. 326,271, filed concurrently herewith and assigned to the same assignee as the present invention.

In carrying the present invention into effect various methods may be employed for effecting chemical interaction between the components. For example I may heat a polyhydric alcohol with an alpha unsaturated alpha beta polycarboxylic acid to produce an acid ester and then esterify this acid ester with a monohydric alcohol-ether. Or, I may first form an acid ester by heating an alpha unsaturated alpha beta polycarboxylic acid with a monohydric alcohol-ether and thereafter esterify this acid ester with a polyhydric alcohol. Or, in some cases, a mixture of a polyhydric alcohol and a monohydric alcohol-ether may be caused to react with the alpha unsaturated alpha beta polycarboxylic acid. In all cases it is desirable that the reaction be carried out in an inert (non-oxidizing) atmosphere, for example by bubbling nitrogen or carbon dioxide through the reaction mass during the reaction period.

In order that those skilled in the art better may understand how the present invention may be carried into effect, the following examples are given by way of illustration and not by way of limitation.

*Example 1*

|  | Parts by weight | Mols, approximately |
|---|---|---|
| Maleic anhydride | 294 | 3 |
| Glycerol (95%) | 193.6 | 2 |
| Tetrahydrofurfuryl alcohol | 250 | 2.45 |
| d-Camphorsulfonic acid (esterification catalyst) | 0.4 |  |

The maleic anhydride and glycerol were mixed and caused to react with nitrogen bubbling through the mixture until a reaction product having an acid value of 262 was obtained. The tetrahydrofurfuryl alcohol and d-camphorsulfonic acid were added and the mass heated over a period of 30 minutes to 200° C., followed by heating for 1½ hours at 200° to 225° C. The product was a soft, reddish-amber resin having an acid number of 35. This resin is soluble in acetone, ethyl acetate and a solvent mixture consisting of 85% acetone and 15% toluene. It is compatible with an equal amount of cellulose acetate. This resin is particularly suited for the preparation of liquid coating compositions where temperatures of the order of 100° to 120° C. are to be used in the baking schedule.

*Example 2*

|  | Parts by weight | Mols, approximately |
|---|---|---|
| Maleic anhydride | 196 | 2 |
| Glycerol | 61.3 | ⅔ |
| Tetrahydrofurfuryl alcohol | 204 | 2 |

A monoester of maleic acid was produced by heating the maleic anhydride and the tetrahydrofurfuryl alcohol in a reaction vessel placed on a steam bath for 1 hour. Thereafter the glycerol was added and heating was continued for 1 hour at 180° to 190° C., for 2 hours at 200° to 210° C. and for an additional hour at 210° to 230° C., with nitrogen bubbling through the reaction mass at all times. The resulting liquid resin had an acid value of 66 and is suitable for use in the production of coating compositions.

*Example 3*

|  | Parts by weight | Mols, approximately |
|---|---|---|
| Maleic anhydride | 196 | 2 |
| Glycerol | 92 | 1 |
| Tetrahydrofurfuryl alcohol | 204 | 2 |

Reaction was effected between the maleic anhydride and the glycerol by heating these components together for 30 to 40 minutes at about 180° C. in a nitrogen atmosphere until a product having an acid value of about 300 was obtained. The tetrahydrofurfuryl alcohol was added and the mass heated at 160° to 200° C. for 1½ hours and at 200° to 225° C. for an additional 2¼ hours. The resulting esterification product was a viscous, reddish, resinous syrup having an acid number of 49 and a cure time of approximately 5 seconds when a small mass of the material was worked on a 200° C. hot plate. A liquid coating composition formed of approximately equal parts by volume of this syrup and a 80–20 toluene-alcohol solvent mixture yielded a hard, tough film after 13 minutes' baking at 150° C. By incorporating 0.3% of a drier, specifically a cobalt drier, into the solution of the resin, a coating composition capable of air drying in 7 hours to a hard, tough, abrasion-resistant film was obtained.

*Example 4*

|  | Parts by weight | Mols, approximately |
|---|---|---|
| Fumaric acid | 232 | 2 |
| Glycerol | 92 | 1 |
| Tetrahydrofurfuryl alcohol | 204 | 2 |

The above ingredients were mixed and interacted, with nitrogen bubbling through the mixture, by heating at 160° to 165° C. for 1¼ hours, at 165° to 200° C. for 1¼ hours and at 200° to 220° C. for 1⅓ hours. The resulting product was a reddish-amber, soft, sticky resin having an acid value of 55 and a cure time of about 3 seconds when a small mass of the material was worked on a 200° C. hot plate. The polymerizable resin is soluble in acetone, diacetone, ethyl acetate, ethylene dichloride, furfural, furfuryl alcohol, and in mixtures of benzene and alcohol, toluene and alcohol and 85% acetone-15% toluene. A 50% solution of the resin in diacetone baked to a hard, glossy finish in 5 minutes at 150° C. In addition to use in the preparation of coating compositions, the polymerizable resin also may be used in the production of molding compounds and molded articles. For example, the resin may be mixed with an equal weight of wood flour and 0.2% by weight of the whole of benzoyl peroxide to form a molding composition which may be shaped under heat and pressure to form molded objects of good mechanical strength and surface appearance.

*Example 5*

|  | Parts by weight | Mols, approximately |
|---|---|---|
| Maleic anhydride | 196 | 2 |
| Ethylene glycol | 93 | 1½ |
| Tetrahydrofurfuryl alcohol | 204 | 2 |

A monoester of maleic acid having an acid value of 313 was prepared as described under Example 2. Thereafter the ethylene glycol was added and the mass was heated for 3 hours at 170° to 200° C., followed by 3½ hours' additional heating at approximately 220° C. The resulting product was a soft, sticky resin having an acid value of 13. It dissolved in a solvent mixture of 85% acetone and 15% toluene. A coating and impregnating composition was made by mixing

|  | Parts by weight |
|---|---|
| Resin | 100 |
| Mixture of 85% acetone and 15% toluene | 50 |
| Benzoyl peroxide | 0.5 |

Paper was coated and impregnated with this solution. After removing the solvent by heating the impregnated paper at 100° C., the resin was converted in situ to the insoluble infusible state by heating superimposed sheets of the impregnated paper for a short time at 150° C. under pressure. The laminated sheets were well bonded together by the resin.

Example 6

|  | Parts by weight | Mols, approximately |
|---|---|---|
| Maleic anhydride | 392 | 4 |
| Glycerol | 184 | 2 |
| Ethylene glycol monoethyl ether | 360 | 4 |

The maleic anhydride and ethylene glycol monoethyl ether were heated together for ¾ of an hour, during which time the temperature rose to 136° C. At this point the glycerol was added and heating was continued for 3 hours up to 190° C., followed by heating for an additional 5 hours up to 200° to 220° C. The resulting fluid resin had an acid value of 40 and was soluble in a mixture of 2 parts toluene and 1 part butanol. A steel plate coated with a 40% solution of this resin was placed in a 150° C. oven. The coating dried to a hard, tack-free film after heating for 10 minutes at this temperature. The same varnish solution to which was added a small amount of cobalt bimaleate was applied to a glass plate. The coating dried to a tack-free condition upon standing for 18 hours at room temperature.

Example 7

Same formula as in Example 6 with the exception that 536 parts (4 mols) diethylene glycol monoethyl ether was used in place of ethylene glycol monoethyl ether. Essentially the same procedure was used in making the resin as described under Example 5 with the exception that a somewhat shorter reaction period was employed. The reaction product was a very fluid resinous mass having an acid value of about 30. It is well suited for the production of coating compositions.

Example 8

|  | Parts by weight | Mols, approximately |
|---|---|---|
| Maleic anhydride | 980 | 10 |
| Pentaerythritol | (¹) | |
| Tetrahydrofurfuryl alcohol | 1020 | 10 |

¹ See below.

The tetrahydrofurfuryl alcohol and maleic anhydride were heated at 80° C. The application of heat was discontinued and the temperature rose to 120° C. The reaction product had an acid value of 290. The mass was then vacuum-distilled to yield a light yellow resinous syrup having an acid value of 396. Five hundred grams of this syrup were caused to react with 119 grams pentaerythritol, yielding a fluid resin having an acid value of 73 and soluble in a mixture of 75 parts solvent naphtha and 25 parts butanol. Coating compositions prepared from this resin dried rapidly at elevated temperatures to yield hard, tough films.

It will be understood, of course, that this invention is not limited to the specific ingredients named in the above illustrative examples. Thus polyhydric alcohols other than those specifically mentioned may be employed, for example diethylene glycol, triethylene glycol, tetraethylene glycol, propylene glycol, dipropylene glycol, trimethylene glycol, 1,3-butylene glycol, mannitol, sorbitol, diglycerol, etc. Mixtures of polyhydric alcohols also may be used. Examples of other alpha unsaturated alpha beta polycarboxylic acids which may be employed are itaconic, mesaconic, citraconic, aconitic, etc. In certain cases it may be desirable to use mixtures of the alpha unsaturated alpha beta polycarboxylic acids to impart particular characteristics to the end-products. If available, anhydrides of these polycarboxylic acids may be employed. The terms "polycarboxylic acid" and "dicarboxylic acid," as used generally herein and in the appended claims, therefor are intended to include within their meaning the anhydrides of such acids.

Illustrative examples of other monohydric alcohol-ethers which may be used, singly or mixed, in carrying the present invention into effect include Ethylene glycol monomethyl ether
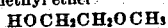

Ethylene glycol monobutyl ether

Ethylene glycol monophenyl ether
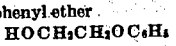

Ethylene glycol monobenzyl ether
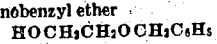

Ethylene glycol monocinnamyl ether

Ethylene glycol monovinyl ether

Ethylene glycol monoallyl ether

Ethylene glycol monomethallyl ether
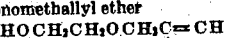

Ethylene glycol monoethallyl ether
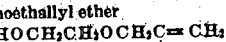

Diethylene glycol monomethyl ether
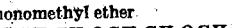

Diethylene glycol monobutyl ether

Diethylene glycol monophenyl ether
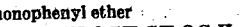

Diethylene glycol monobenzyl ether
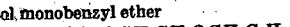

Diethylene glycol monocinnamyl ether
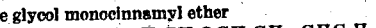

Diethylene glycol monovinyl ether
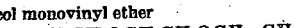

Diethylene glycol monoallyl ether
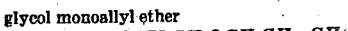

Diethylene glycol monomethallyl ether
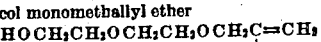

and corresponding ether derivatives of other glycols, e. g., propylene glycol, dipropylene glycol, 1,3-butylene glycol, triethylene glycol, tetraethylene glycol, pentaethylene glycol, hexaethylene glycol, heptaethylene glycol, octaethylene glycol, and higher homologues.

In general, I may use any monohydric alcohol-ether containing one and only one alcoholic hydroxyl (OH) group and at least one OR group, where R represents any hydrocarbon radical, for example any straight-chain or branched-chain, saturated or unsaturated aliphatic radical, any carbocyclic radical including aryl radicals and heterocyclic radicals, or any alkaryl or aralkyl radicals. Thus, I may use any monoalkyl, monoaryl, monoalkaryl or monoaralkyl ether of a dihydric alcohol, numerous examples of which ethers have been given above. Exceptionally good results, particularly from the standpoint of rapidity of polymerization and hardness and toughness of the cured film, have been obtained when using the monohydric alcohol-ether known generally in the trade as tetrahydrofurfuryl alcohol. This material more properly may be termed a heterocyclic monohydric alcohol-ether.

From the foregoing it will be seen that the products of this invention comprise an unsaturated alkyd resin (esterification product of a polyhydric alcohol and an alpha unsaturated alpha beta polycarboxylic acid) which has been internally modified with a monohydric alcohol-ether containing a single alcoholic hydroxyl group and at least one ether (—C—O—C—) linkage. In most cases it is desirable for economic and other reasons to use a monohydric alcohol-ether containing from one to nine or ten ether linkages. Products of widest general application and having good curing characteristics and excellent resistance (in cured state) to abrasion, moisture and solvents are obtained with monohydric alcohol-ethers containing at least one and not more than two ether linkages.

It will be understood, of course, that the products of this invention may be chemically or physically modified in many different ways. Thus, in certain cases, for example where rapidity of drying and hardness of the dried film are of secondary consideration, it may be desirable to incorporate a fatty oil or a fatty oil acid into the monohydric alcohol-ether modified unsaturated alkyd resin. This may be done, for instance, by chemically interacting a polyhydric alcohol, a monohydric alcohol-ether, an alpha unsaturated alpha beta polycarboxylic acid and a fatty oil or fatty oil acid, or mixture thereof. Examples of fatty substances which may be employed are linseed oil, China-wood oil, perilla oil, oiticica oil, soya bean oil, cocoanut oil, castor oil, etc., and the fatty acids of such oils. The term "fatty oil" as used generally herein and in the appended claims therefore is intended to include within its meaning the acids of a fatty oil.

The new polymerizable esters of this invention may be peroxidized, for instance by heating in contact with air or oxygen. Advantageously the ester is peroxidized by agitating it in air while simultaneously heating it at a suitable temperature, for example at 30° to 100° C. Either mechanical or air agitation may be employed. The ester also may be mechanically stirred while simultaneously passing a stream of air or oxygen into the mass. In some cases it may be desirable to peroxidize the ester in the absence of applied heat, for instance at room temperature (20° to 25° C.). In general, the lower the temperature of peroxidization, the longer the time required; and, conversely, the higher the temperature, the shorter the time. The peroxidized compounds properly may be said to be peroxides of the above-described esters. Thus, peroxidized glyceryl tetrahydrofurfuryl maleate also may be termed glyceryl tetrahydrofurfuryl maleate peroxide. The peroxidized esters then may be employed in suitable amounts to accelerate the polymerization of other polymerizable organic compounds, for instance compounds containing a

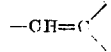

grouping, specifically a

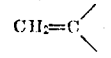

grouping. When using the peroxidized esters as polymerization catalysts, it is desirable that the ester have a peroxide equivalent per gram of material of at least $8 \times 10^{-6}$, preferably $80 \times 10^{-6}$ or more. The meaning of "peroxide equivalent" is explained in my copending application Serial No. 326,271.

The polymerizable, peroxidized or unperoxidized esters of this invention may be polymerized separately, or mixed with each other, or mixed with other organic compounds containing a

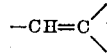

grouping. Thus, these new polymerizable esters may be mixed and copolymerized with, for example, polymerizable esters containing ethylenic or acetylenic unsaturation in either the alcohol radical or the acid radical, or in both, e. g., saturated and unsaturated alcohol esters of unsaturated monocarboxylic and polycarboxylic acids, unsaturated alcohol esters of non-ethylenic polycarboxylic acids (e. g., phthalic, succinic, adipic, etc.), unsaturated alcohol esters of saturated monocarboxylic acids, etc. Examples of

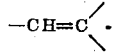

containing compounds with which these new esters may be copolymerized to yield new compositions of particular utility in the plastics and coating arts are vinyl cyclic compounds, e. g., styrene, methyl styrene, para chloro styrene, divinyl benzene, vinyl naphthalene, vinyl furane, etc.; unsaturated ethers, e. g., ethyl vinyl ether, methallyl propyl ether, etc.; unsaturated ketones, e. g., methyl vinyl ketone, divinyl ketone, methyl allyl ketone, etc.; itaconic esters, e. g., dialkyl itaconates, diaryl itaconates, etc.; acrylic and alkacrylic compounds, e. g., acrylic nitrile, methacrylic nitrile, esters of esterifiable acrylic compounds, for instance methyl, ethyl, propyl, butyl, etc., acrylates and alkacrylates, more specific examples of which latter are methyl methacrylate, methyl ethacrylate, ethyl methacrylate, ethyl ethacrylate, etc.

Additional examples of organic compounds containing a

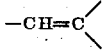

grouping which may be employed, separately or mixed, in forming these new interpolymerization products are given in the copending applications of Nordlander and Margrave Serial No. 302,164, filed October 31, 1939, Nordlander Serial Nos. 302,165 and 302,166, also filed October 31, 1939, D'Alelio Serial No. 313,103, filed January 9, 1940, and in the other copending applications referred to in the said D'Alelio application. All of these copending applications are assigned to the same assignee as the present invention.

The interpolymers may be produced by mixing the components and effecting copolymerization with the aid of heat, light or heat and light. When the peroxidized esters are employed in suitable amounts, no other polymerization catalyst is required. When the unperoxidized esters are mixed and copolymerized with polymerizable organic compounds containing a

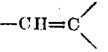

grouping, then in order to lessen the time required to form the interpolymer it may be desirable to add a small amount, say 0.1 to 2.0 per cent by weight of the whole, of a polymerization catalyst such as benzoyl peroxide, acetyl benzoyl peroxide, lauryl peroxide, stearoyl peroxide, etc.

In forming the polymeric bodies (simple polymers and interpolymers) of this invention, polymerization may be effected at room temperature (20° to 25° C.) or at elevated temperatures, but generally is within the range of 60° to 130° C. In forming the copolymers the proportions of components may be varied widely, depending upon the particular starting materials, the conditions of polymerization and the particular properties desired in the end-product.

These new compositions may be used alone or mixed with fillers, dyes, pigments, opacifiers, lubricants, plasticizers or other modifying agents in, for example, surface coating, impregnating, adhesive, laminating, casting and molding applications. Of course, the choice of the addition agents is influenced by the particular constitution of these new simple or mixed esters and the particular application for which they are to be used. In preparing liquid coating compositions from these new polymerizable resins, suitable volatile solvents, driers, pigments, etc., may be mixed therewith in order to obtain a composition best adapted for the particular service application. Oils, such as drying and semi-drying oils, also may be suitably incorporated into the liquid coating material.

These new synthetic materials also may be modified, as desired or as conditions may require, by the addition of high molecular weight bodies with or without resinous characteristics. Examples of such bodies are proteins, protein-aldehyde condensation products, furfural condensation products, phenol-aldehyde condensation products, urea-aldehyde condensation products, aniline-aldehyde condensation products, sulfonamide-aldehyde resins, polyvinyl compounds such as polyvinyl alcohol, polyvinyl acetals such as polyvinyl formal, synthetic linear condensation superpolymers, e. g., the superpolyamides, natural gums and resins such as copal, shellac, rosin, etc. polyhalogenated aromatic derivatives, etc.

Molding (moldable) compositions comprising the synthetic materials of this invention may be thermoplastic or thermosetting, depending upon the particular starting components, the proportions thereof and the conditions of polymerization of the simple or mixed polymerizable materials. Thus, molded articles comprising these new interpolymerization products may be, for example, fusible or infusible under heat, or insoluble, or insoluble and infusible, depending upon such factors as just stated. The molding compounds may include the usual addition agents, including fillers such as wood flour, alpha cellulose, asbestos, glass fibers, sheets or cuttings of paper, cloth, canvas, etc.; also, mold lubricants such as waxes, metallic soaps, etc., plasticizers, dyes, etc.

In coating, impregnating and similar applications the monomeric or partly polymerized materials of this invention, with or without added solvent, may be applied to the object to be treated and polymerized as hereinbefore described, with or without the application of pressure, to form the polymer or copolymer in situ. These new synthetic materials may be used as impregnants for many porous bodies such as corks, felts, fabricated bodies with interstices, such as the windings of electrical coils, netted fibers, interwoven fibrous materials, etc. They also may be used for protectively coating impervious articles, e. g., metals, in the production of wire enamels and winding tapes, for coating or coating and impregnating articles such as paper, wood, cloth, glass fibers, in felted, woven or other form, concrete, linoleum, synthetic boards, etc. These new synthetic bodies also may be used in making laminated fibrous sheet materials wherein superimposed layers of cloth, paper, etc., are firmly bonded together with the synthetic body.

The new esters of this invention are particularly valuable as ingredients of varnishes, enamels, primers, etc., of the air-drying or baking types. The resin films are fast drying and oxygen-convertible to an infusible state. The air-dried or baked films have good flexibility and are usually hard and tough. The rapid drying properties of the polymerized esters of this invention as compared with the natural drying oils are shown by the results of the following tests:

A polymerizable liquid tetrahydrofurfuryl glycol maleate resin was prepared by reacting, in an inert atmosphere, 2 mols tetrahydrofurfuryl alcohol, 1 mol ethylene glycol and 2 mols maleic anhydride. Glass plates were coated with a film of this resin and with a film of raw linseed oil. The coated plates were placed in a 130° C. oven for ten minutes. Upon removal from the oven the resin coating was hard, flexible and non-tacky. In marked contrast the linseed oil coating was still fluid and showed no appreciable polymerization or drying of the oil.

What I claim as new and desire to secure by Letters Patent of the United States is:

1. A peroxidized product of esterification under heat of ingredients consisting of a polyhydric alcohol, tetrahydrofurfuryl alcohol and an alpha unsaturated alpha beta polycarboxylic acid.

2. A resinous product of esterification under heat of a mixture of ingredients consisting of polyhydric alcohol, tetrahydrofurfuryl alcohol and maleic anhydride.

3. A resinous product of esterification under heat of a mixture of ingredients consisting of glycerol, tetrahydrofurfuryl alcohol and fumaric acid.

4. The method of producing new synthetic resins especially adapted for coating, impregnating and adhesive applications which comprises causing to esterify to resin formation a mixture of ingredients consisting of polyhydric alcohol, tetrahydrofurfuryl alcohol and an alpha unsaturated alpha beta polycarboxylic acid, said esterification reaction being carried out under heat in a nonoxidizing atmosphere.

5. A resinous product of esterification under heat of ingredients consisting of polyhydric alcohol and tetrahydrofurfuryl alcohol with an alpha unsaturated alpha beta polycarboxylic acid, said esterification product being heat-convertible in the presence of oxygen to an insoluble state.

MAYNARD C. AGENS.